US007267345B2

(12) United States Patent
Maggiori

(10) Patent No.: US 7,267,345 B2
(45) Date of Patent: Sep. 11, 2007

(54) LEVELING INSTRUMENT, AN ELECTROMECHANICAL LIFTER AND A SELF LEVELING INTEGRATED LIFTING SYSTEM USING BOTH OF THEM

(76) Inventor: Roberto Maggiori, Via Groentandla, 21, Pomezia (Rome) (IT) 00040

( * ) Notice: Subject to any disclaimer, the term of this patent is extended or adjusted under 35 U.S.C. 154(b) by 425 days.

(21) Appl. No.: 10/420,941

(22) Filed: Apr. 23, 2003

(65) Prior Publication Data

US 2004/0211945 A1 Oct. 28, 2004

(51) Int. Cl.
*B60G 17/00* (2006.01)

(52) U.S. Cl. ................................................... 280/6.153

(58) Field of Classification Search ............. 280/6.153, 280/6.15

See application file for complete search history.

(56) References Cited

U.S. PATENT DOCUMENTS 5,580,095 A * 12/1996 Fukumoto ................ 280/766.1

OTHER PUBLICATIONS

European Search Report dated Oct. 8, 2004 issued in European Patent Application No. 02425657.0, 3 pages.

* cited by examiner

*Primary Examiner*—Faye M. Fleming
(74) *Attorney, Agent, or Firm*—Nixon & Vanderhye P.C.

(57) ABSTRACT

This self-leveling device is employed in the field of lifting of aircraft, helicopters, civil and military flying vehicles, watercraft, camping vehicles, trains, bridges, radar, etc., and for all those activities that require self-leveling and centring during lifting and lowering operations with fast results, without damages to the structure and in perfect safety (eg.: for helicopter lifting, for internal load balance, for safety during take-off and landing). The device is composed of a number of electromechanical lifting groups that operate synchronistically and autonomously from one another, linked with an electronic central general control for operation and a leveling cell. The whole system provides perfect self-leveling in case of unstable ground, for weighing and leveling purposes, targeting, weight balance, maintenance, etc.

9 Claims, 13 Drawing Sheets

BASE AND LIFTING GROUP

FIG. n. 01
BASE AND LIFTING GROUP
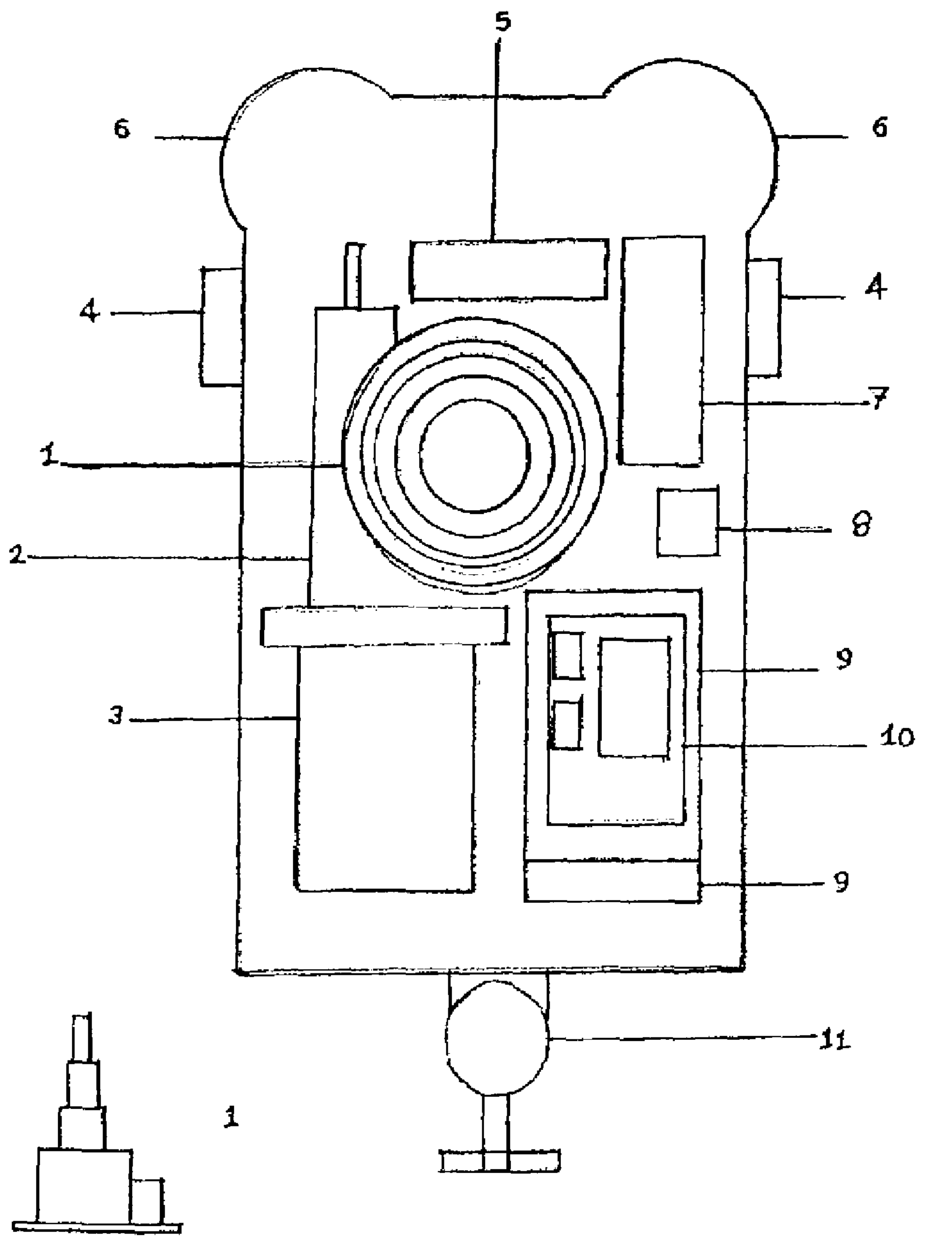

Fig. n. 02
LIFTING GROUP
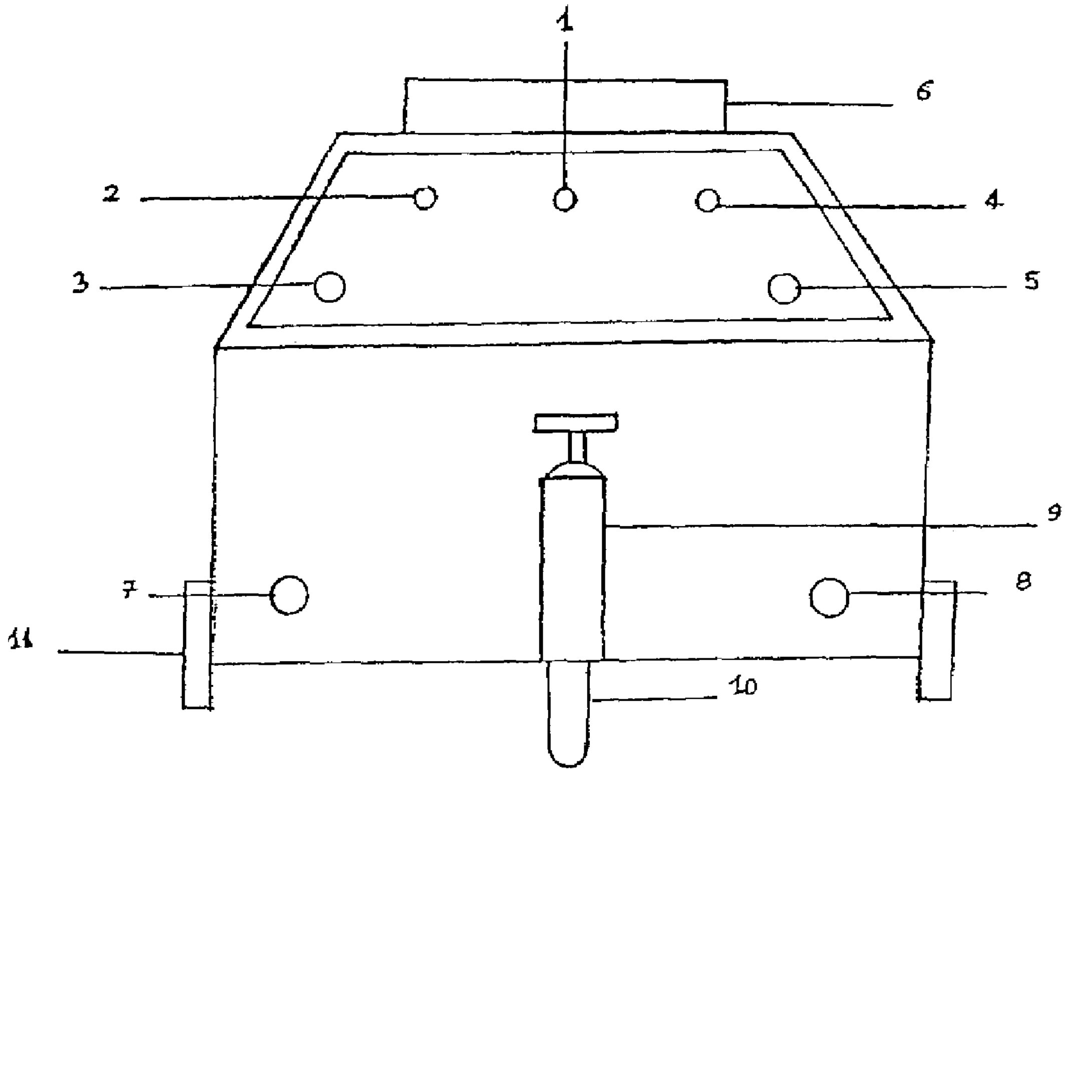

Fig. n. 03
LIFTING GROUP
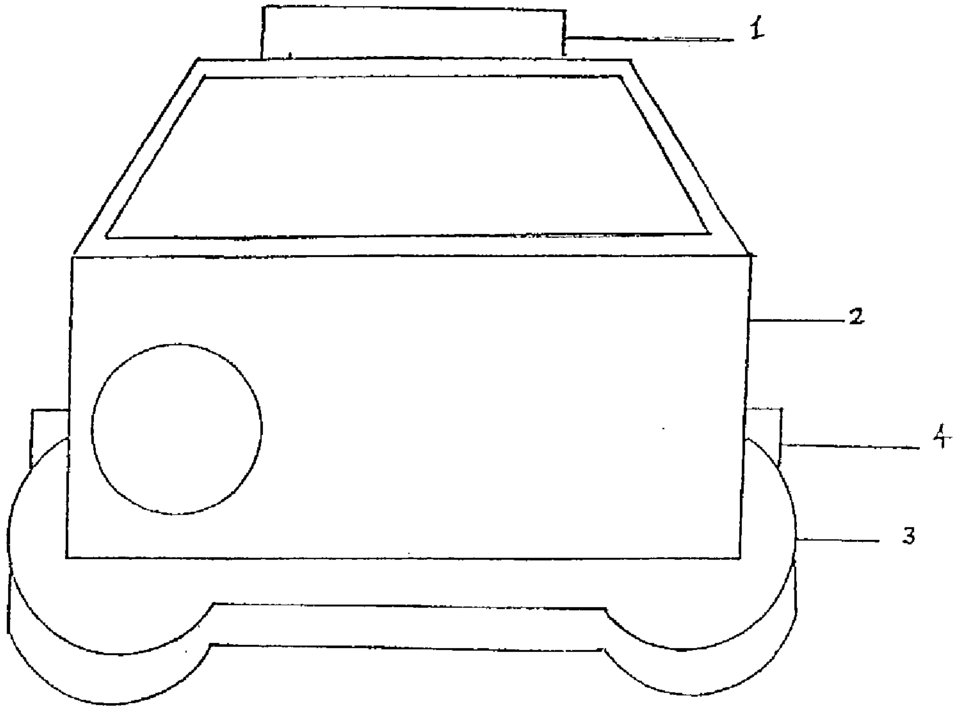
LATERAL VIEW WITH UPPER COVER
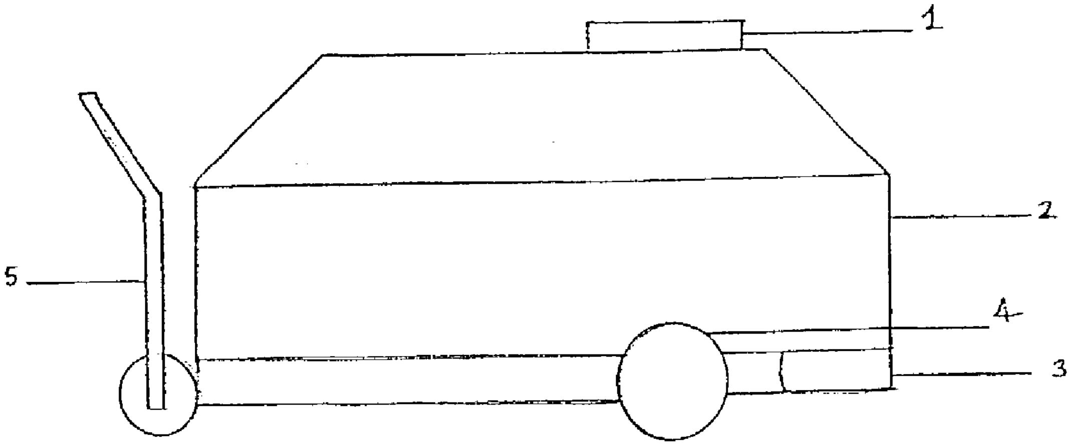

Fig. n. 04
LIFTING GROUP
TOP-VIEW
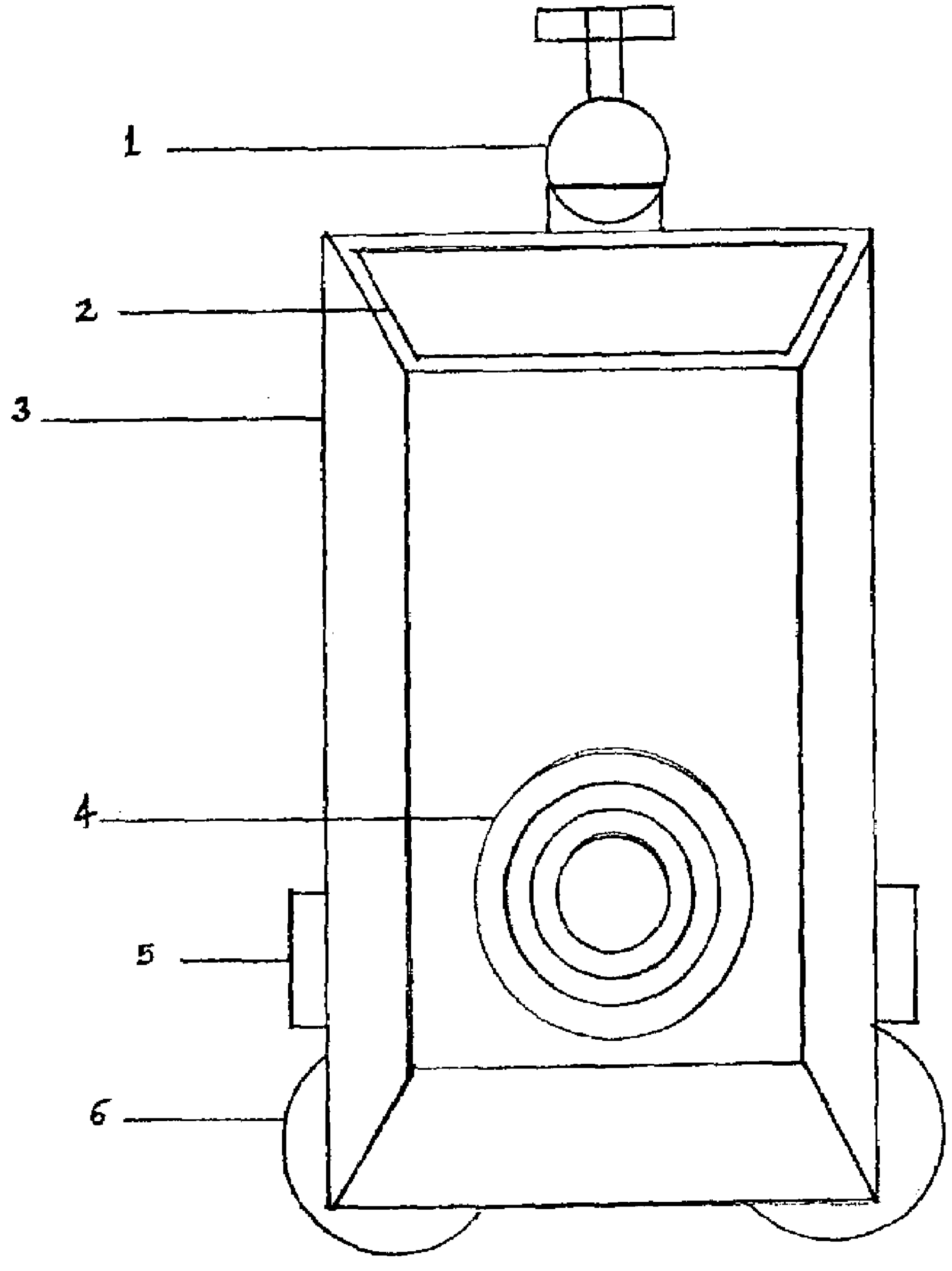

Fig. n. 04-1 a)
LIFTING GROUP
ASSEMBLY
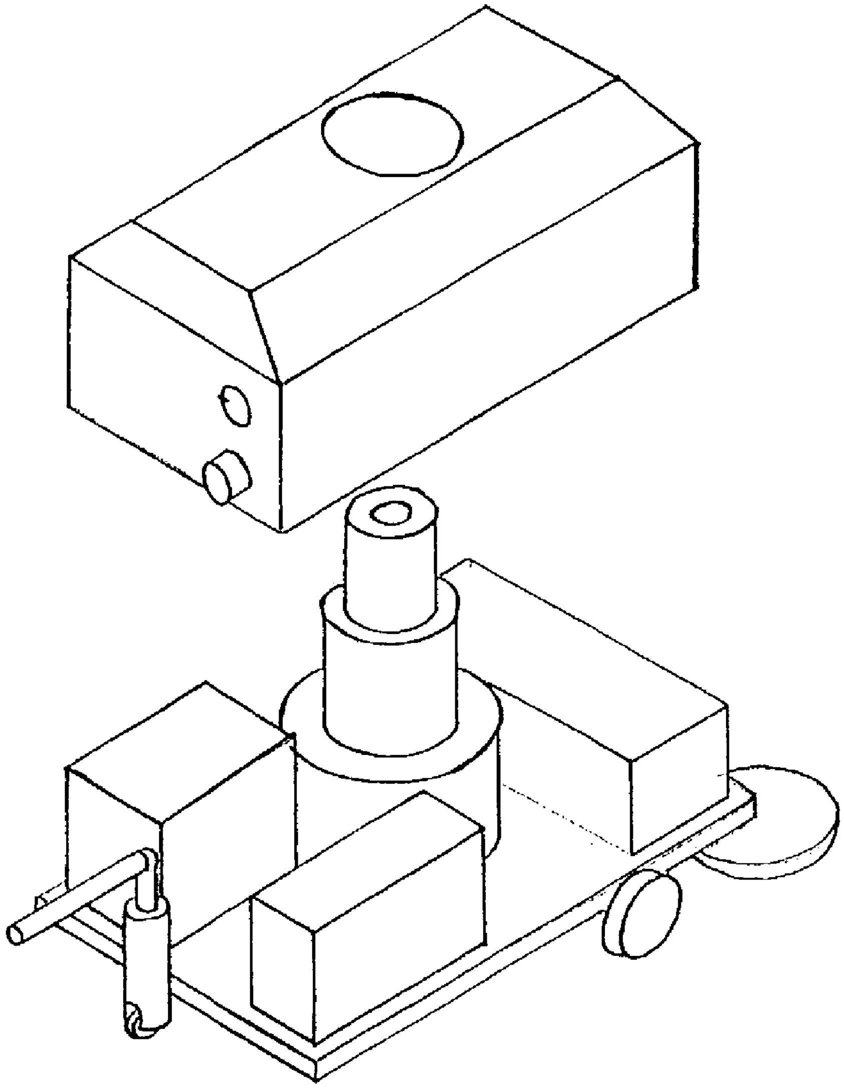

Fig. n. 05
LEVEL CELL
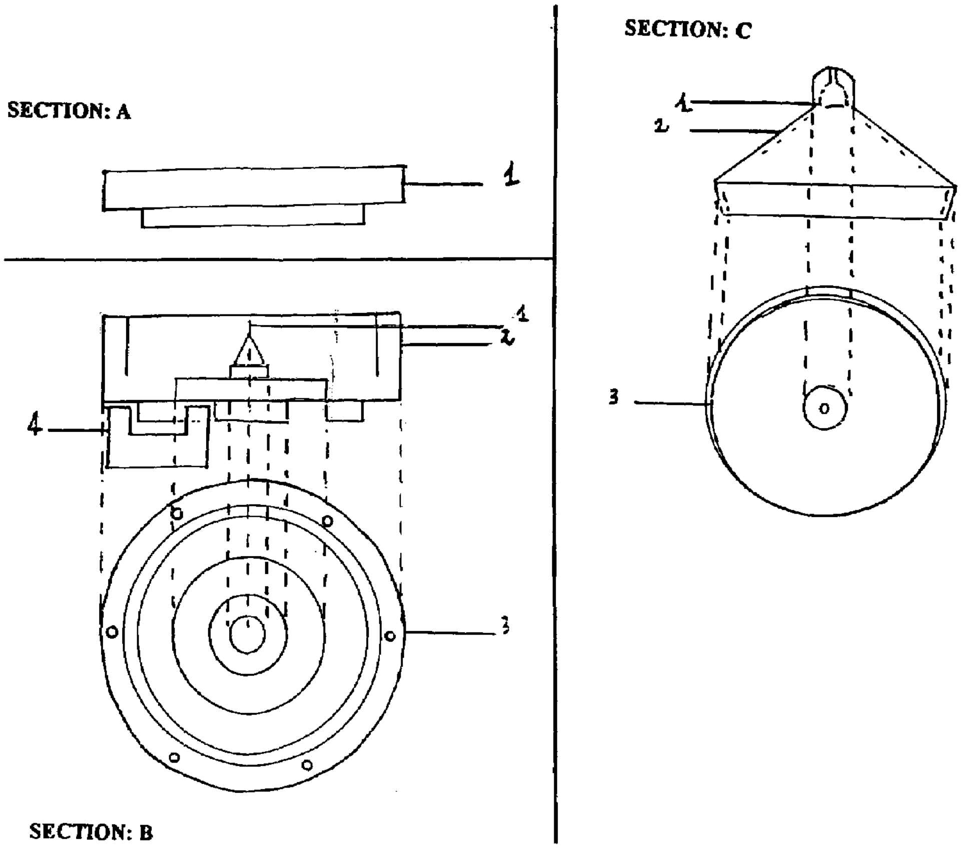

Fig. n. 06
LEVELING CELL CONTAINER
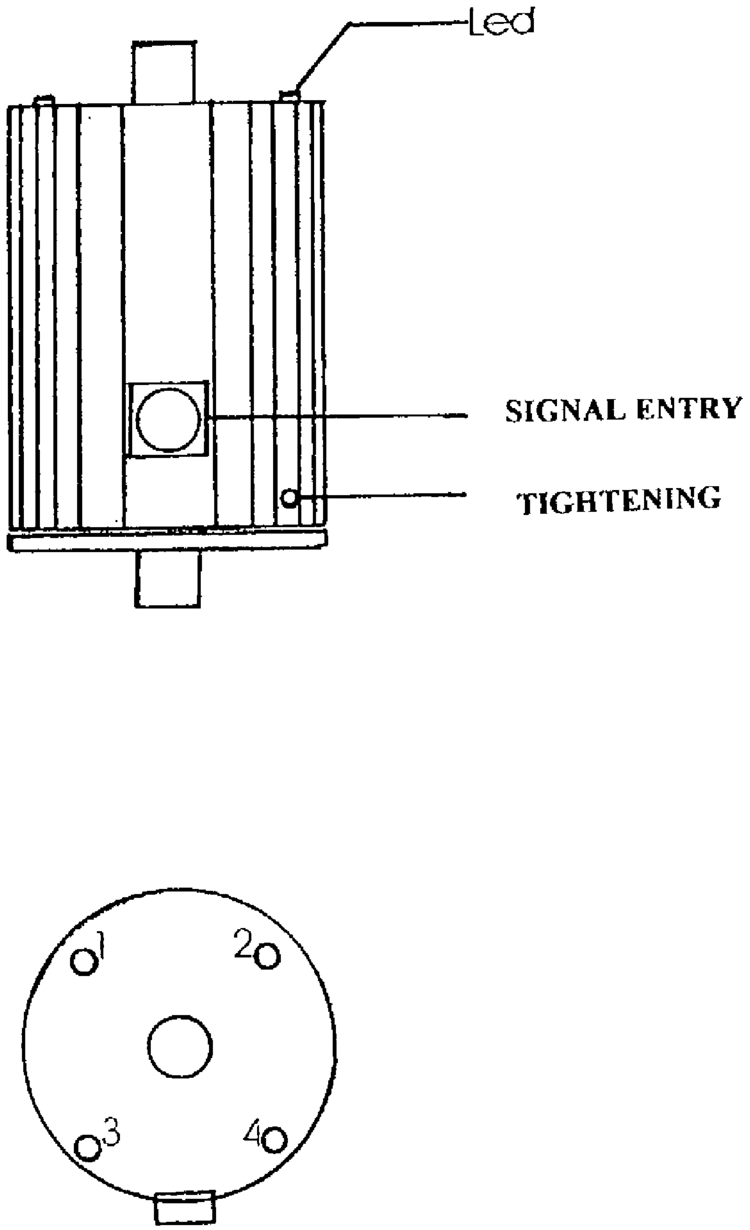

Fig. n. 07
SUPPORT TELESCOPIC POLE
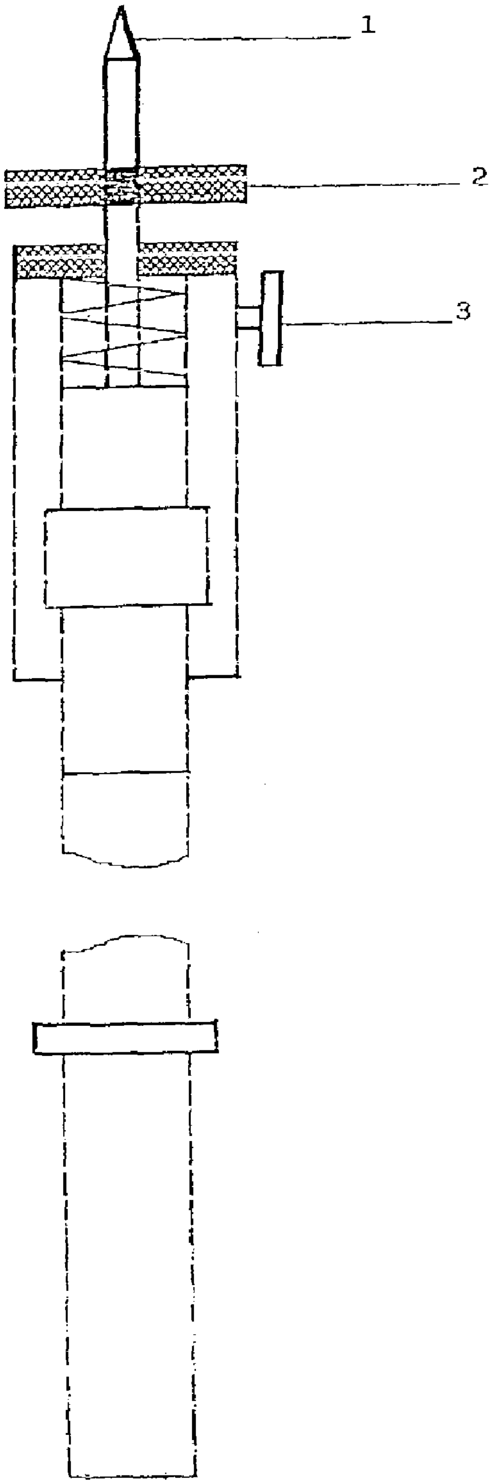

Fig. n. 08
GONIOMETRIC SHIFT SYSTEM
MODEL "A"
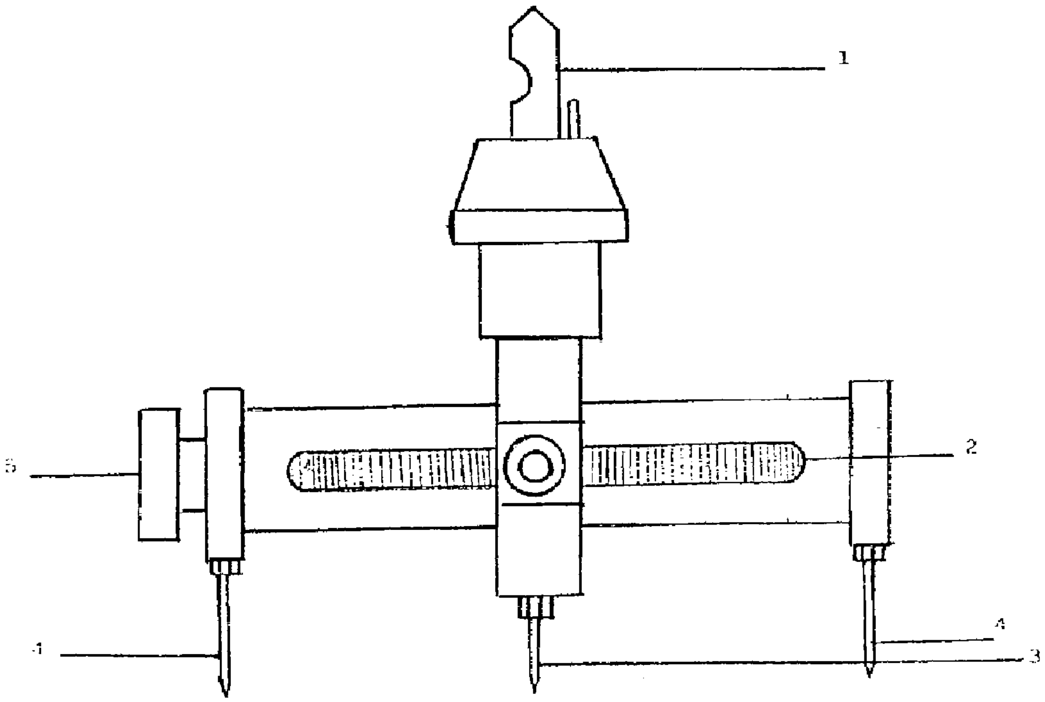

Fig. n. 09
GONIOMETRIC SHIFT SYSTEM
MODEL "B"
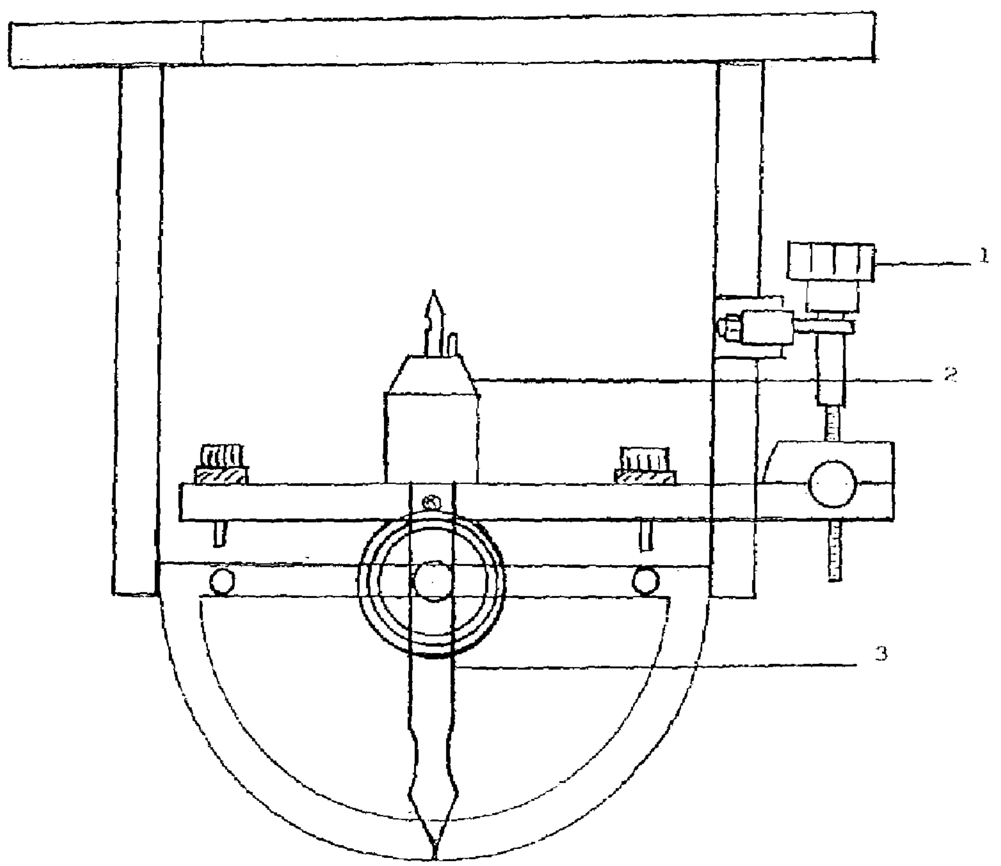

Fig. N. 10
LIFTING GROUP
WITH TRIPOD BASE
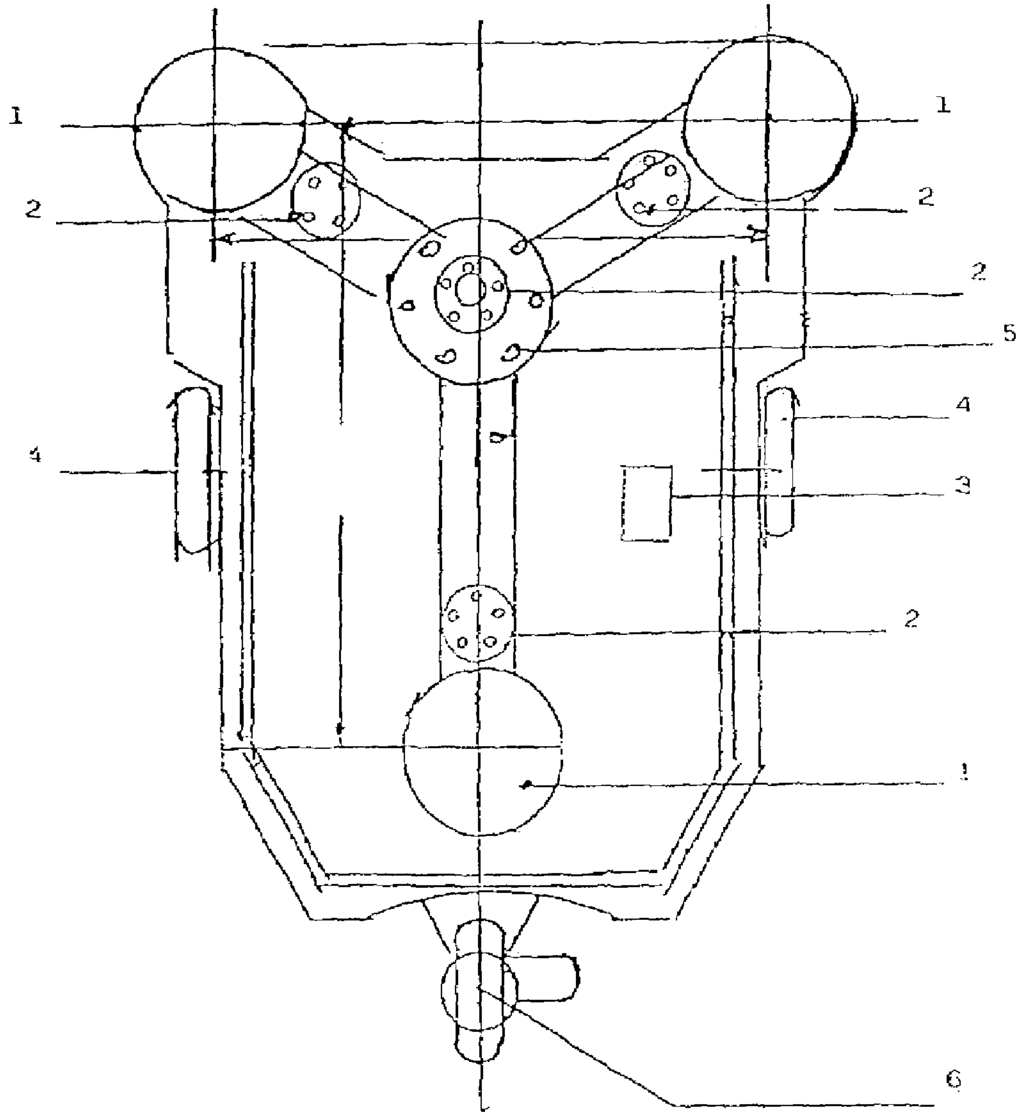

Fig. N. 11
SELF- CENTRING
FLOATING HEAD
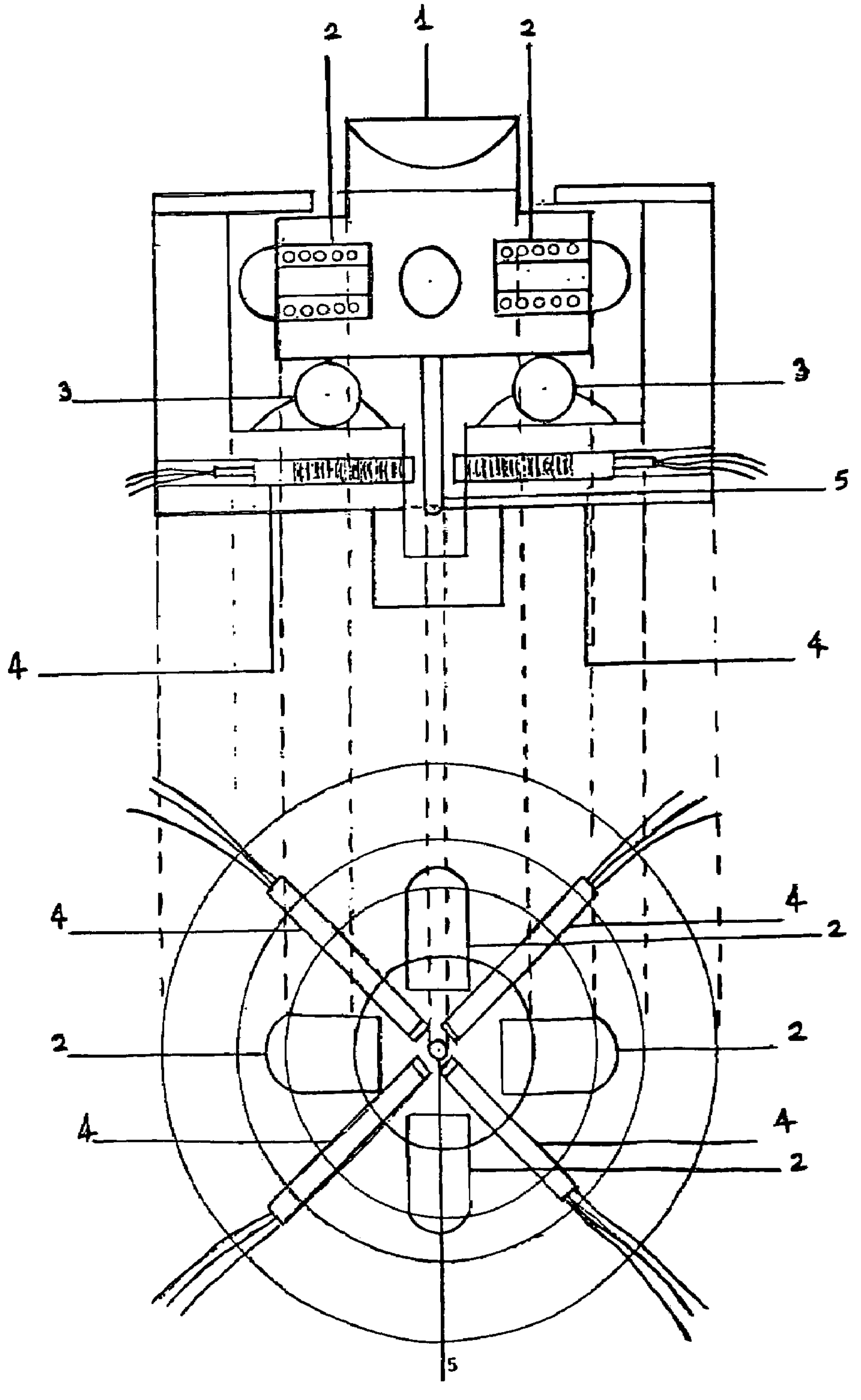

Fig. N. 12
CENTRAL GENERAL CONTROL
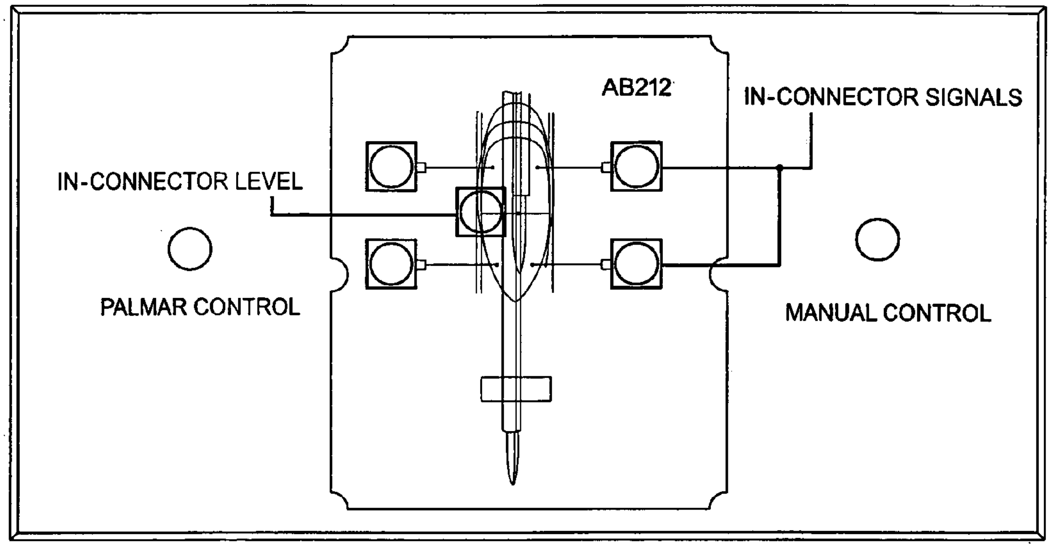

LEVELING INSTRUMENT, AN ELECTROMECHANICAL LIFTER AND A SELF LEVELING INTEGRATED LIFTING SYSTEM USING BOTH OF THEM

BACKGROUND OF THE INVENTION

The invention relates to the field of lifting devices. In particular, this lifting device is used for lifting and lowering operations, for leveling purpose, for self-leveling and weighing of: aircrafts, such as aeroplanes, helicopters, civil and military aircrafts, watercraft, camping vehicles and similar, cars and trains, bridges, radar, and any other structure and/or object to which it can be applied.

Existing procedures for lifting of aeroplanes, helicopters, and civil and military aircrafts are used for weighing, balancing, maintenance and leveling, hydraulic jacks or self assisted for lifting, which are activated by manual methods. This manual operation is obtained by a minimum of five operators taking time of actuation. Moreover, there is a risk that a structural yielding of the hydraulic jack during the operation of lifting may cause damages to persons and things.

It is in fact obvious that the manual operation causes instability and lack of precision of the leveling, and consequently it is difficult to bring suitable corrections of the same weight, corrections that are required for the safety of the flight. Moreover, the operators move in a state of insecurity and dangerously, because they work under the same aircraft for the proper maneuvers, and they find difficulty in transporting the same hydraulic jacks for the attack upon the linking points of the aircraft; even uncontrolled movements of this aircraft are taken place during lifting and lowering operations, caused by suspensions of the main retractable undercarriages. This happens very frequently, and after many years of verifications in this field, these problems still remain caused to this empiric existing method of lifting. In the specific field of airlines and transport aeroplanes, civil and military, of transport and similar and however for aircrafts of big dimensions, for the operations of lifting, balance, leveling, maintenance and above all to centre the linking point of the aircraft, four hydraulic jacks or self assistant type are used, including a front one (secondary), two principal centrals, and an auxiliary rear which is controlled manually, during the lifting for the proper correction of the weight, because it must have respect of the maximum load allowed by the aircraft specifications of construction and to avoid damages to the structure and at the same time to control the exceeding weight. Moreover, dangerous lateral movements of the aircraft load with eventual structural damages of the aircraft can be verified during the operation of lifting and lowering caused to the instability of its linking point and of its load. The operators in order to avoid the disadvantage of lateral movements of the cargo of the aircraft, throw a mineral oil on the ground to make so that the movement of the axis of the linking point comes compensated from the forced sliding. This kind of operation is really difficult. Moreover it is imperfect to foresee more or less the exceeding load of the tail of the aircraft, which cannot exceed the established load of safety. In many cases structural damages of aircrafts have been verified.

BRIEF SUMMARY OF THE INVENTION

This Self-Leveling Integrated Lifting device brings the following improvements: It is composed by three or more lifting groups (FIG. 01 and FIG. 10) that are all manufactured with "nut-screw" system (FIG. 01, part. 1). This lifting group works autonomous or in synchronous speed to have a self-leveling operation to reference to a leveling cell (FIG. 05). The agglomerate of this Self Leveling Integrated Lifting device in order to avoid that one of the jacks for effect of instability to the ground doesn't guarantee one perfect adherence, (as an example during the operations of lifting, a separation may happen from the linking points scheduled on the aircrafts and helicopters, etc.), it assures the raising and therefore it allows a perfect weighing and leveling to balance the weight; it is completely automatic only when the linking points scheduled by the aircraft are perfectly adherent to the ground and its linking points.

The benefits of this innovation are: fully electronic management and at distance, only with an operator who with this device operates in less time for the lifting and lowering; to allow the lifting in emergency situations in which is indispensable in less time to supply the apparatus and balance the weight upon the aircraft before the takeoff; reduced maintenance and easy use owned to the considerable mobility of the lifting groups; high safety owned by the use of "nut-screw" penetrable, self-blocking, which at the end of the lifting operation, avoids possible instabilities of the attitude obtained upon the aircraft, besides accidental lowering. Moreover, an absolutely new feature is represented by the fact that lifting and, therefore, lowering can be obtained in synchronism, with a special floating head for centring operation in case of application to large-dimension aircraft.

Another feature is the display of partial and total weights and leveling measurement, this latter being possibly obtained acoustically as well. Self-leveling is also useful to operate on mobile surfaces, such as floating platforms, aircraft carriers, etc. In the specific case of various camping vehicles, perfect internal attitude is required for electrical appliances (refrigerators, etc.) and for people inside, independent of the ground the vehicle rests on. At the moment, in order to obtain perfect attitude, either hydraulic or electrical, manually-controlled jacks are used, which need to be stabilised and levelled by the same user who surveys leveling from inside, through a visual level. It is clear that balancing is not perfect in this case, in particular when the ground below is unstable, which may bring about damage to the vehicle's structure because the jacks are independent and not automatically controlled. The advantages of the Self-leveling Integrated Lifting device include perfect load balance and attitude of people inside the vehicle, in addition to increased stability of the vehicle itself, due to the above-described characteristics, since self-leveling is performed automatically even in the case of unstable conditions of the ground.

Lifting of bridges for ordinary maintenance, i.e., replacement of joints and support to devices necessary to check regularly the bridge stability and capability to sustain load, is today performed by manually-operated hydraulic jacks, with subsequent economic losses of manpower and working hours, in addition to possible damage to people or things. The benefits of the Self-leveling Integrated Lifting device include shorter time for automatic application, with the above-reported characteristics but different capability of resistance to loads in lifting and lowering, in addition to synchronous, automatic lifting of one or more lifting groups, which avoids possible damage to the structure or users. The Self-leveling Integrated Lifting device also allows to reduce time losses and overwork for operation and is perfectly safe for the stability of the lifters used by an operator alone.

BRIEF DESCRIPTION OF THE DRAWINGS

After these general preliminary remarks, technical description and various designs are reported below for preferred, non-restrictive, realisation of the devise called Self-leveling Integrated Lifting with reference to the accompanying drawings, in which:

FIG. 01 shows a top-view design of the whole lifting group apparatus without its upper cover. It includes 11 particulars: 1) lifting jack sectors; 2) reduction units; 3) motor; 4) wheels; 5) run-out switch; 6) bearing base and supports; 7) battery-charger; 8) adhesion sensor; 9) accumulators; 10) electronic command system; 11) steering rod.

FIG. 02 shows the front-view design of a lifting group with upper cover, including the keyboard , movement wheel and steering rod. It includes 11 particulars; 1) voltage LED; 2) manual/automatic switch; 3) signal entry; 4) up/down knob; 5) ON/OFF key; 6) lifting jack head; 7) battery disconnecter; 8) battery indicator; 9) steering rod; 10) movement wheel; 11) wheels.

FIG. 03 shows the rear-view design of a lifting group with upper cover including support bases, plus lateral view with upper cover. It includes 5 particulars: 1) lifting jack head; 2) cover; 3) supports; 4) wheels; 5) steering rod and movement wheel.

FIG. 04 shows the top-view of a lifting group with its upper cover. It includes 6 particulars: 1) guidance knob and movement wheel; 2) keyboard; 3) cover; 4) lifting jack head; 5) wheels; 6) supports.

FIG. 04-1 shows the lifting group assembly.

FIG. 05 shows the level cell. It includes: Section A: 1) cover. Section B: 1) wedge pin; 2) antishock case of the methacrylate cell; 3) projection of the cell antishock case; 4) sensors. Section C: 1) wedge pin slot (sect. B, part. 1); 2) mechanical pendulum; 3) projection of the swaying bell.

FIG. 06 shows the leveling cell container. It includes 3 particulars, i.e., LED, signal entry, tightening.

FIG. 07 shows the support telescopic pole. It includes 3 particulars: 1) plumb line reference thrust rod; 2) approach knob; 3) lifting/lowering regulation cursor.

FIG. 08 shows model "A" of the goniometric shift system. It includes 5 particulars: 1) clutch of the leveling cell container; 2) threaded internal screw; 3) reference push rod; 4) positioning push rods; 5) regulation knob.

FIG. 09 shows model "B" of the goniometric shift system. It includes 3 particulars: 1) regulation knob; 2) clutch of the leveling cell container; 3) reference index of degree shifting.

FIG. 10 shows the lifting group with tripod base for large-dimension aircraft. It includes 6 particulars: 1) antivibrant supports of the tripod base; 2) fifth wheels with balls; 3) self-adhesion automatic sensor; 4) wheels; 5) lifter housing; 6) motor steering rod.

FIG. 11 shows self-centring floating head. It includes 5 particulars: 1) aircraft link point; 2) pin and springs for centring; 3) fifth-wheel with balls; 4) sensors; 5) centring reference pin.

FIG. 12 shows the central general control front panel, including 4 particulars: 1) IN-connector for signals from lifters; 2) IN-connector of the level; 3) IN-connector of palmar control; 4) manual control.

DETAILED DESCRIPTION OF THE INVENTION

The lifting device is made of three or more groups of ELECTRO-MECHANICAL LIFTERS (FIGS. 01 and 04), a CENTRAL GENERAL CONTROL (FIG. 12), and a LEVELING CELL (FIG. 05). Each ELECTROMECHANICAL LIFTER (FIG. 01) is constituted by the following elements: a load-bearing base and some supports (FIG. 01, particular 6) equipped with moving wheels (FIG. 01, particular 4), each including the following parts: a jack with "nut-screw system", i.e., bronze-threaded, penetrating, telescopic screws and bushings with one or more sectors (FIG. 1, particular 1), two accumulators (FIG. 01, particular 9), a battery charger (FIG. 01, particular 7), a reduction unit (FIG. 01, particular 2) a motor (FIG. 01, particular 3), a run-out switch and synchronism control (FIG. 01, particular 5), electronic control of the above elements (FIG. 01, particular 10), an adhesion sensor (FIG. 01, particular 8) for automatic control of one or more lifting groups and for function of the self-leveling mechanism with reference to the LEVELING CELL (FIG. 01), and a keyboard (FIG. 02). Every lifting group is self-functioning, being integrated with an electronic card apparatus (FIG. 01, particular 10) that can be operated at various degrees of speed or in multiple, for control function in synchronism of every lifting group, with automatic weight control that follows lifting by controlled push of the load. This synchronous control function allows to perform lifting and lowering operations. In case of lifting of large dimension aircraft, due to the impossibility to know any rear-load excess—which cannot be greater than that fixed for safety and centring operations of the aircraft, the lifting system is also provided with an automatic sensor to avoid possible structural damage of the aircraft, also aimed at overcoming difficulties in transport of the lifting system itself. This self-adhesion automatic sensor is necessary for multiple control during the synchronous function, and provides perfect lifting and weighing just as all points expected to link to the vehicle are presently and perfectly attached with the linking points, so that any detachment is avoided. Moreover, the lifting group is equipped with a tripod base, with the specific shape and structure as shown in FIG. 10, and protective fairing which makes orbital and axial movements automatically, and is formed by steel fifth-wheels for support (FIG. 10, particular 2), suitable for acceptable load. This allows to perform the automatic centring operation by means of a self-centring, floating head (FIG. 11), for anchorage with the vehicle's link point and for automatic control of lifting—both upward and downward—in order that exact centring is recovered on a real-time basis to avoid any lateral shifting of the aircraft load.

The self-centring floating head (FIG. 11) for the specific lifting device at the rear of the aircraft, functions as an automatic control (self-controlled version) of the rear shift, by never exceeding the safety load limits given in the aircraft specifications after proper calibration. In particular, during lifting and lowering, the following actions take place: two main lifting devices together with the rear lifting group (FIG. 10) start the aircraft detachment from ground. This rear lifting group possesses an automatic weighing system that follows lifting with a controlled-load push. If the load is exceeding or insufficient for aircraft attitude, as provided for in the aircraft specifications, a load cell—suitably calibrated according to load requirements—stops automatically the whole lifting system by displaying the excess or defect load (safety threshold). After recovering regular attitude, the operation may be repeated. These lifting and lowering operations can be performed by a single operation outside the aircraft, who uses a palmar remote control in perfect safety, rapidly and with little energy, thanks to the easy handling of the device (FIG. 10, particulars 6 and 4).

The CENTRAL GENERAL CONTROL (FIG. 12) is composed of a remote control for self-leveling and manual operations (FIG. 12, particular 4) plus a system with electrical command card for self-leveling, linked with the lifting groups (FIG. 12, particular 1) by means of wires or radio control. The central general control (FIG. 12) is aimed at receiving and processing signals coming from the leveling cell (FIG. 05) through wires linked with the IN-connector of the level (FIG. 12, part. 2). As soon as received, the signals are co-ordinated by the electrical command card. By a series of accumulators (FIG. 01, part. 9) placed within the lifting group, this card supplies the energy necessary for the lifters to start and drives them to their self-leveling operation, either in synchronism or singularly. The whole apparatus is enclosed in a portable metal case that allows the user to control and operate the different lifting groups by means of a keyboard (FIG. 12).

The LEVELING CELL (FIG. 05) is an integrated, compact, airtight device with fluid-controlled oscillation that represents constant reference for the whole system, placed within the aircraft by means of a telescopic sustaining pole (FIG. 07), directly linked with the central general control (FIG. 12) or with the electronic command apparatus (FIG. 01, part. 10) through electric multipolar wire. It is made of the following components: a mechanical pendulum (FIG. 05, sect. C, part. 2) placed on a suitable, highly sensitive, wedge pin (FIG. 05, sect. B, part. 2) enclosed in an airtight methacrylate cell (FIG. 5, sect. B, part. 2), submerged in antifreeze fluid for antishock effect. The leveling cell is enclosed in a suitable container (FIG. 06) together with the following components: external reading sensors (FIG. 05, sect. B, part. 4—description of mortise positioning of the sensor inside the container FIG. 06), with infrared, photoelectric, or similar power of interception of the mechanical pendulum shifts (FIG. 05), LED for sensor interception and sensitivity regulators for leveling calibration. The leveling cell is equipped with supports appropriate for every kind of means to be lifted and self-levelled. FIG. 07 shows a sustaining telescopic pole with a spherical sector that operates in reference to the leveling cell (FIG. 05) whose container (FIG. 06) is placed below the telescopic pole itself in order to make possible amplification of the sensitivity of pendulum shift and, therefore, to attain further leveling precision. The whole system is designed to obtain centring and/or self-leveling and/or leveling as a substitute for the currently used plumb line.

At the basis of the whole device (including telescopic pole and leveling cell container) there is a "goniometric" support (FIGS. 08 and 09). The goniometric support is part of the Self-leveling Integrated Lifting device and acts by means of an electronic control device for triangulation, which makes easier the shifting of the longitudinal axis for targeting purposes or aircraft attitude simulation. This goniometric support (FIGS. 08 and 09) interferes with micrometrical shift by either manual or servo-controlled rotation of a knob (FIG. 08, part. 05; FIG. 09, part. 1) placed at the basis of the graduated goniometre to perform manual simulation maneuvers. In fact, by means of the triangulation system for aircraft survey that is present in the goniometric support, which utilizes three special control cells, it allows a single user to perform centring operations automatically, in the shortest operational time and with utmost accuracy. The leveling cell (FIG. 05) is placed inside the aircraft by means of its support telescopic pole (FIG. 07) and connected through multipolar electric wire to either the electronic command apparatus including an electronic card (FIG. 01, part. 10) placed inside each lifting group (FIG. 01) for autonomous function, or the IN-connector of the level in the central general control (FIG. 12, part. 2) also provided with electric command card for function in synchronism of the various lifting groups.

Every shift of the mechanical pendulum in the level cell is translated by the external reading sensors into electrical impulses, which in turn are sent to the electronic command system or central general control (FIG. 01, part. 10) through wires and therefore translated into shifts by the electronic card for signal control that interprets them as lifting and/or lowering and moves the lifters.

The invention claimed is:

1. A self-leveling integrated lifting system used for lifting and lowering operations, for leveling purpose, for self-leveling and weighing aircrafts, watercrafts and other large structures, said system comprising:

a) at least three lifting groups of electro-mechanical nut-screw type;

b) a central general control;

c) a leveling cell;

d) a reduction unit;

e) a motor;

f) an automatic weighing system; and g) a control panel, wherein each one of said lifting groups is provided with a self-centering floating head.

2. A system according to claim 1, comprising at least four lifting groups of electro-mechanical nut-screw type, each group having an adhesion sensor for automatic control of said group for function of the self-leveling mechanism with reference to the leveling cell c).

3. A system according to claim 1, further comprising at least one of the following components: two accumulators, a battery charger, electronic control for motor e).

4. A system according to claim 1, wherein said lifting groups work autonomously.

5. A system according to claim 1, wherein said lifting groups work in synchronous speed to reference to a leveling cell.

6. A system according to claim 1, wherein a display of partial and total weights and/or leveling measurement is provided.

7. A system according to claim 1, further comprising a display of leveling measurement.

8. A system according to claim 7, wherein the display of leveling measurement is acoustical.

9. A self-leveling integrated lifting system used for lifting and lowering operations, for leveling purpose, for self-leveling and weighing aircrafts, watercrafts and other large structures, said system comprising:

a) at least three lifting groups of electro-mechanical nut-screw type;

b) a central general control in communication with the lifting groups;

c) a leveling cell coupleable with the structure to be lifted, the leveling cell communicating with the central general control;

d) a motor that drives the lifting groups;

e) a reduction unit coupled between the motor and the lifting groups; and f) a control panel serving as an operator interface and communicating with the central general control, wherein each one of said lifting groups is provided with a self-centering floating head.

* * * * *